(12) United States Patent
Wang et al.

(10) Patent No.: US 12,106,169 B2
(45) Date of Patent: Oct. 1, 2024

(54) NANO MEMORY CARD AND TERMINAL

(71) Applicant: Huawei Technologies Co., Ltd., Shenzhen (CN)

(72) Inventors: Yuchuan Wang, Shanghai (CN); Yubao Huang, Shanghai (CN); Haining Shi, Shanghai (CN); Shunan Fan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 338 days.

(21) Appl. No.: 17/627,447

(22) PCT Filed: Jul. 14, 2020

(86) PCT No.: PCT/CN2020/101847
§ 371 (c)(1),
(2) Date: Jan. 14, 2022

(87) PCT Pub. No.: WO2021/008518
PCT Pub. Date: Jan. 21, 2021

(65) Prior Publication Data
US 2022/0261609 A1  Aug. 18, 2022

(30) Foreign Application Priority Data
Jul. 15, 2019  (CN) .......................... 201910636288.4

(51) Int. Cl.
*G06K 19/077* (2006.01)
*G06K 7/00* (2006.01)

(52) U.S. Cl.
CPC ..... *G06K 19/07732* (2013.01); *G06K 7/0021* (2013.01); *G06K 19/07743* (2013.01)

(58) Field of Classification Search
CPC ....... G06K 19/07732; G06K 19/07743; G06K 7/0021
See application file for complete search history.

(56) References Cited

U.S. PATENT DOCUMENTS

| 2005/0037647 | A1  | 2/2005 | Le |
| 2006/0118641 | A1  | 6/2006 | Hwang et al. |
| 2008/0080148 | A1  | 4/2008 | Park |
| 2013/0009294 | A1  | 1/2013 | Chen |
| 2020/0022273 | A1* | 1/2020 | Han ..................... H05K 3/4007 |
| 2020/0210800 | A1* | 7/2020 | Pinto ................ G06K 19/07739 |

FOREIGN PATENT DOCUMENTS

| CN | 101739582 A  | 6/2010 |
| CN | 101826666 A  | 9/2010 |
| CN | 207965941 U  | 10/2018 |
| CN | 109711522 A  | 5/2019 |
| CN | 110458272 A  | 11/2019 |
| DE | 19500925 A1  | 7/1996 |

* cited by examiner

*Primary Examiner* — Laura A Gudorf
(74) *Attorney, Agent, or Firm* — Conley Rose, P.C.

(57) ABSTRACT

A nano memory card and a terminal, where the nano memory card includes a card body, a chip, and an interface, where the chip is disposed inside the card body, the interface is disposed on a surface of the card body, the chip is electrically coupled to the interface, the card body includes a first surface and a second surface that are disposed oppositely, the interface includes a plurality of contacts, and the contacts are distributed on the first surface and the second surface. The contacts are arranged on both the first surface and the second surface of the card body.

20 Claims, 5 Drawing Sheets

NANO MEMORY CARD AND TERMINAL

CROSS-REFERENCE TO RELATED APPLICATIONS

This is a U.S. National Stage of International Patent Application No. PCT/CN2020/101847 filed on Jul. 14, 2020, which claims priority to Chinese Patent Application No. 201910636288.4 filed on Jul. 15, 2019. Both of the aforementioned applications are hereby incorporated by reference in their entireties.

TECHNICAL FIELD

This application relates to the field of communications technologies, and in particular, to a nano memory card and a terminal.

BACKGROUND

A terminal has become an important communication tool in people's lives and work. In an existing nano memory card (nano memory card, NM memory card for short) applied to the terminal, a data transmission speed is not high because of a limitation of contact arrangement, which restricts development of a terminal technology.

SUMMARY

A technical problem to be solved in embodiments of this application is to provide a nano memory card and a terminal that can increase a data transmission speed.

To achieve the foregoing object, the following technical solutions are used in implementations of this application.

According to a first aspect, an embodiment of this application provides a nano memory card, including a card body, a chip, and an interface, where the chip is disposed inside the card body, the interface is disposed on a surface of the card body of the memory card, the chip is electrically connected to the interface, the card body includes a first surface and a second surface that are disposed oppositely, the interface includes a plurality of contacts, and the plurality of contacts are distributed on the first surface and the second surface.

The plurality of contacts are distributed on the first surface and the second surface. In other words, the contacts are arranged on both the first surface and the second surface of the card body. A quantity of contacts is increased, thereby increasing a data transmission speed of the memory card.

In an implementation, four contacts distributed on the first surface and at least four contacts distributed on the second surface are used to transmit data.

In this implementation, four contacts distributed on the first surface are used to transmit data, and at least four contacts distributed on the second surface are used to transmit data. In this way, at least eight contacts of the nano memory card are used to transmit data, which can meet the 8-bit mode in the eMMC protocol 5.0, to achieve a higher transmission speed, for example, a bus speed of 200 MB/s in the HS200 mode and a bus speed of 400 MB/s in the HS400 mode.

In an implementation, contacts distributed on the first surface include a first contact group and a second contact group that are disposed at intervals along a first direction; the first contact group and the second contact group each include a first contact, a second contact, a third contact, and a fourth contact that are disposed sequentially along a second direction; the first direction is different from the second direction; the first contact in the first contact group, the third contact in the first contact group, the first contact in the second contact group, and the fourth contact in the second contact group are used to transmit data; the second contact in the first contact group is used to transmit a power supply signal; the fourth contact in the first contact group is used to transmit a clock signal; the second contact in the second contact group is used to transmit a power supply ground signal; and the third contact in the second contact group is used to transmit a command signal.

In this implementation, a manner of arranging contacts on the first surface of the nano memory card is the same as that of an existing nano memory card, so that the nano memory card in this implementation can be recognized by and compatible with a single-sided card holder in an existing terminal, thereby facilitating use.

In an implementation, contacts distributed on the second surface include a third contact group and a fourth contact group that are disposed at intervals along the first direction, the third contact group and the fourth contact group each include a first contact and a second contact that are disposed sequentially along the second direction, and the first contacts and the second contacts in both the third contact group and the fourth contact group are used to transmit data. The third contact group and the fourth contact group are arranged along the first direction, and the contacts in the third contact group and the fourth contact group are disposed sequentially along the second direction. This improves convenience of preparing the nano memory card.

In an implementation, the fourth contact group further includes a third contact, the second contact in the fourth contact group is located between the first contact in the fourth contact group and the third contact in the fourth contact group, and the third contact in the fourth contact group is used to transmit a power supply ground signal.

In an implementation, the third contact group further includes a third contact, the second contact in the third contact group is located between the first contact in the third contact group and the third contact in the third contact group, and the third contact in the third contact group is used to transmit a power supply ground signal or a data strobe signal.

In an implementation, the card body includes a first substrate and a second substrate fastened to the first substrate that are disposed oppositely, the chip is fastened on a surface of the second substrate facing the first substrate, the first surface is a surface of the first substrate facing away from the second substrate, and the second surface is a surface of the second substrate facing away from the first substrate. The card body is formed by combining the first substrate and the second substrate, thereby facilitating preparation of the nano memory card.

In an implementation, a first substrate includes a first plate body and a first electrical-connection part, the first surface is a surface of the first plate body facing a second substrate, and the first electrical-connection part is convexly disposed on the surface of the first plate body facing the second substrate. The second substrate includes a second plate body and a second electrical-connection part, the second surface is a surface of the second plate body facing the first substrate, the second electrical-connection part is convexly disposed on the surface of the second plate body facing the first substrate, and the first electrical-connection part and the second electrical-connection part are interconnected by using a solder ball, thereby simplifying an inner structure of the nano memory card.

In an implementation, the first electrical-connection part includes a first electrical-connection boss and a first electrical-connection column, the first electrical-connection boss is convexly disposed on a surface of the first plate body facing the second plate body, and the first electrical-connection column is fastened to an end of the first electrical-connection boss facing away from the first plate body. The second electrical-connection part includes a second electrical-connection boss and a second electrical-connection column, the second electrical-connection boss is convexly disposed on a surface of the second plate body facing the first plate body, the second electrical-connection column is fastened to an end of the second electrical-connection boss facing away from the second plate body, and the solder ball is connected between the first electrical-connection column and the second electrical-connection column, thereby reducing use of the solder ball.

In an implementation, the chip is disposed on the surface of the second substrate facing the first substrate. The chip includes a first chip and a second chip that are laminated, where the second chip is disposed on the surface of the second substrate facing the first substrate, and both the first chip and the second chip are electrically connected to the interface.

According to a second aspect, an embodiment of this application further provides a terminal, including a terminal body, a card holder disposed on the terminal body, and the foregoing nano memory card. The card holder includes a cavity, the nano memory card is accommodated in the cavity, an inner wall of the cavity facing a first surface is provided with a plurality of first contact springs, each first contact spring is correspondingly in electrical contact with one contact on the first surface, an inner wall of the cavity facing a second surface is provided with a plurality of second contact springs, and each second contact spring is correspondingly in electrical contact with one contact on the second surface.

In the terminal provided in this implementation of this application, the nano memory card with contacts disposed on both surfaces is used, so that a quantity of contacts is increased. In this way, a data transmission speed of the terminal is increased, and user experience is improved.

DESCRIPTION OF EMBODIMENTS

Figure 1:
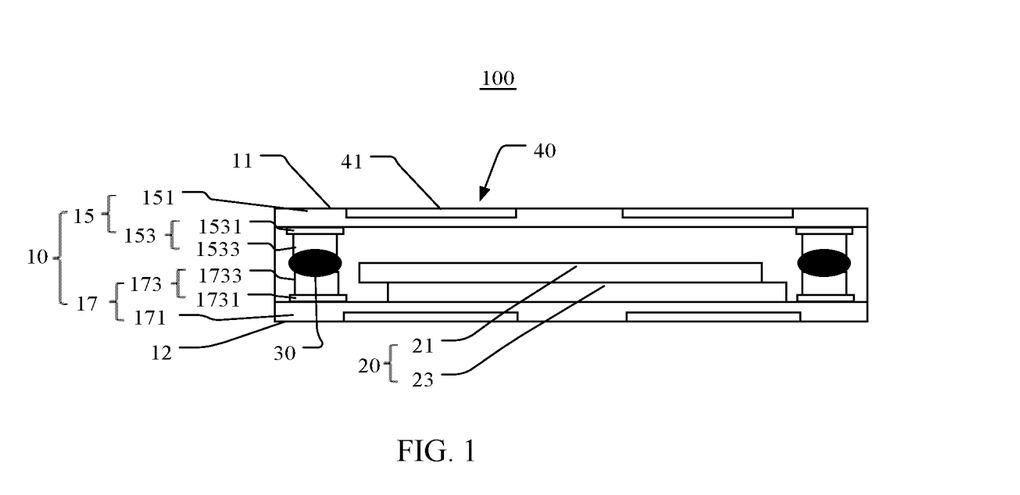
FIG. 1 is a cross-sectional view of a nano memory card according to a first implementation of this application.

FIG. 1 is a schematic structural diagram of a nano memory card according to a first implementation of this application. A nano memory card 100 includes a card body 10, a chip 20, and an interface 40. The chip 20 is disposed inside the card body 10. The interface 40 is disposed on a surface of the card body 10. The chip 20 is electrically connected to the interface 40. The card body 10 includes a first surface 11 and a second surface 12 that are disposed oppositely. The interface 40 includes a plurality of contacts 41. The plurality of contacts 41 are distributed on the first surface 11 and the second surface 12.

The plurality of contacts 41 are distributed on the first surface 11 and the second surface 12. In other words, the contacts 41 are arranged on both the first surface 11 and the second surface 12 of the card body 10, but are not limited to be arranged on a single surface of the nano memory card. A quantity of the contacts 41 is increased, thereby increasing a data transmission speed of the memory card 100.

The card body 10 includes a first substrate 15 and a second substrate 17 fastened to the first substrate 15. The first surface 11 is a surface of the first substrate 15 facing away from the second substrate 17. The second surface 12 is a surface of the second substrate 17 facing away from the first substrate 15. The card body 10 is formed by combining the first substrate 15 and the second substrate 17, thereby facilitating preparation of the nano memory card 100.

The first substrate 15 includes a first plate body 151 and a first electrical-connection part 153. The first surface 11 is a surface of the first plate body 151 facing away from the second substrate 17. The first electrical-connection part 153 is convexly disposed on a surface of the first plate body 151 facing the second substrate 17. The first electrical-connection part 153 is electrically connected to the chip 20 and the contacts 41 distributed on the first surface 11 through wiring (not shown in the figure). The first electrical-connection part 153 includes a first electrical-connection boss 1531 and a first electrical-connection column 1533. The first electrical-connection boss 1531 is disposed on the surface of the first plate body 151 facing the second substrate 17, and the first electrical-connection column 1533 is fastened to an end of the first electrical-connection boss 1531 facing away from the first plate body 151. The first electrical-connection boss 1531 is located between the first electrical-connection column 1533 and the first plate body 151.

The second substrate 17 includes a second plate body 171 and a second electrical-connection part 173. The second surface 12 is a surface of the second plate body 171 facing away from the first substrate 15. The second electrical-connection part 173 is convexly disposed on a surface of the second plate body 171 facing the first substrate 15. The second electrical-connection part 173 is electrically connected to the chip 20 and the contacts 41 distributed on the second surface 12 through wiring (not shown in the figure). The second electrical-connection part 173 includes a second electrical-connection boss 1731 and a second electrical-connection column 1733. The second electrical-connection boss 1731 is convexly disposed on a surface of the second plate body 171 facing the first plate body 151, and the second electrical-connection column 1733 is fastened to an end of the second electrical-connection boss 1731 facing away from the second plate body 171. The second electrical-connection boss 1731 is located between the second electrical-connection column 1733 and the second plate body 171. The second electrical-connection column 1733 and the first electrical-connection column 1533 are interconnected by using a solder ball, thereby reducing use of the solder ball.

The chip 20 is disposed on a surface of the second substrate 17 facing the first substrate 15. The chip 20 includes a first chip 21 and a second chip 23 that are laminated, and the second chip 23 is disposed on the surface of the second substrate 17 facing the first substrate 15. The first chip 21 includes a control unit, and the second chip 23 includes a storage unit. The control unit is electrically connected to the storage unit. In this embodiment, specifically, the nano memory card 100 further includes an interface drive circuit. The storage unit, the control unit, and the interface drive circuit are disposed in the card body 10 of the memory card 100, and the interface is disposed on the surface of the card body of the memory card. In addition, the control unit is electrically connected to the storage unit and the interface of the memory card separately. Specifically, the interface drive circuit is electrically connected to the interface of the memory card and the control unit separately, so that the interface of the memory card is electrically connected to the control unit via the interface drive circuit. It may be understood that the control unit is not limited to be disposed on the first chip 21, and the storage unit is not limited to be disposed on the second chip 23. Alternatively, the control unit and the storage unit may be disposed on a single chip, to reduce a volume of the nano memory card 100 and simplify a structure of the nano memory card 100.

Figure 2:
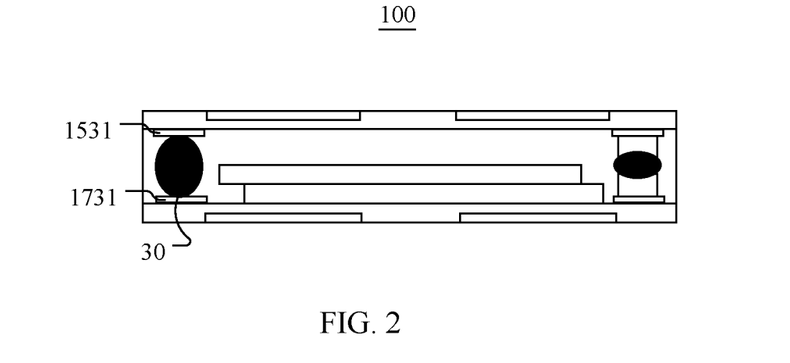
FIG. 2 is a cross-sectional view of a nano memory card according to an implementation of this application.

It may be understood that, referring to FIG. 2, the first electrical-connection part may be not provided with the first electrical-connection column. To be specific, the first electrical-connection part includes the first electrical-connection boss 1531. The second electrical-connection part may be not provided with the second electrical-connection column. To be specific, the second electrical-connection part includes the second electrical-connection boss 1731. A solder ball 30 is directly disposed between the first electrical-connection boss 1531 and the second electrical-connection boss 1731, thereby simplifying a structure of each of the first substrate 15 and the second substrate 17 of the nano memory card 100.

There may be spacings between the contacts 41 (or pins or connection terminals) of the nano memory card 100, and there may also be spacings between the contacts 41 (or pins or connection terminals) and an edge of the nano memory card 100. It can be learned that the contacts 41 of the nano memory card 100 do not fully cover the surface of the card body 10 of the nano memory card 100, and all these spacings are areas on the surface of the card body 10 of the nano memory card 100, so that these areas may be used for wiring setting. To be specific, lines are arranged at the spacings between the contacts 41 (or pins or connection terminals) and the spacings between the contacts 41 (or pins or connection terminals) and the edge of the nano memory card 100. The lines are used to connect the storage unit to the control unit, and the lines are also used to connect the control unit to the interface of the memory card.

Figure 3:
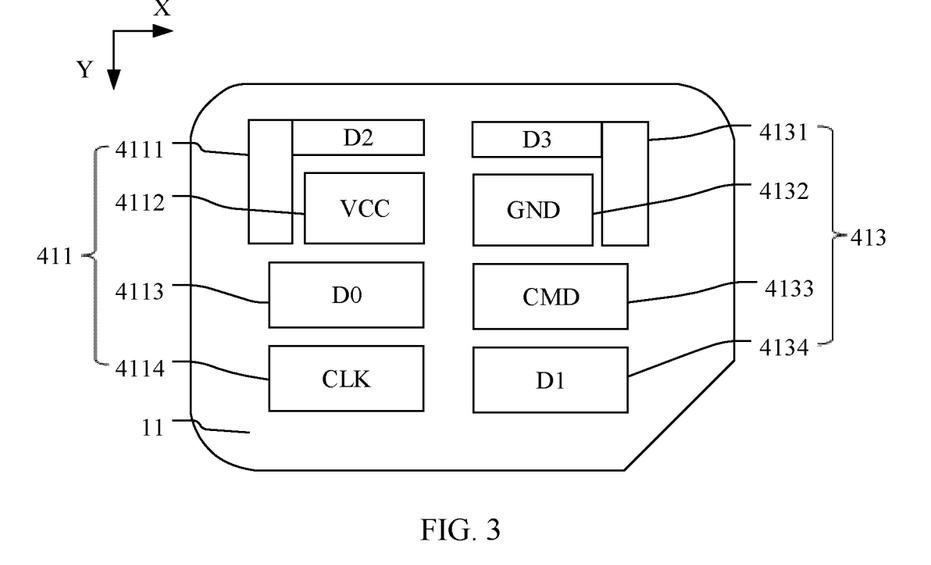
FIG. 3 is a schematic diagram of arrangement of contacts on a first surface of the nano memory card shown in FIG. 1.

As shown in FIG. 3, the contacts 41 distributed on the first surface 11 include a first contact group 411 and a second contact group 413 that are disposed at intervals along a first direction (an X direction shown in FIG. 3). The first contact group 411 includes a first contact 4111, a second contact 4112, a third contact 4113, and a fourth contact 4114 that are disposed sequentially along a second direction (a Y direction shown in FIG. 3). The second contact group 413 includes a first contact 4131, a second contact 4132, a third contact 4133, and a fourth contact 4134 that are disposed sequentially along the second direction. The first direction is different from the second direction. In this implementation, the first contact 4111 is in a same line with the second contact 4112, the third contact 4113, and the fourth contact 4114. The first contact 4131 is in a same line with the second contact 4132, the third contact 4133, and the fourth contact 4134.

The first contact 4111 in the first contact group 411, the third contact 4113 in the first contact group 411, the first contact 4131 in the second contact group 413, and the fourth contact 4134 in the second contact group 413 are used to transmit data (data, D for short). The second contact 4112 in the first contact group 411 is used to transmit a power supply (power supply, VCC for short) signal, and the fourth contact 4134 in the first contact group 411 is used to transmit a clock (clock, CLK for short) signal. The second contact 4132 in the second contact group 413 is used to transmit a power supply ground (power supply ground, GND for short) signal, and the third contact 4133 in the second contact group 413 is used to transmit a command (command/response, CMD for short) signal.

In the first contact group 411, the first contact 4111 is marked as a data transmission pin D2, the second contact 4112 is marked as a power supply signal pin VCC, the third contact 4113 is marked as a data transmission pin D0, and the fourth contact 4114 is marked as a clock signal pin CLK. In the second contact group 413, the first contact 4131 is marked as a data transmission pin D3, the second contact 4132 is marked as a power supply ground signal pin GND, the third contact 4133 is marked as a command signal pin CMD, and the fourth contact 4134 is marked as a data signal pin D1.

Figure 4:
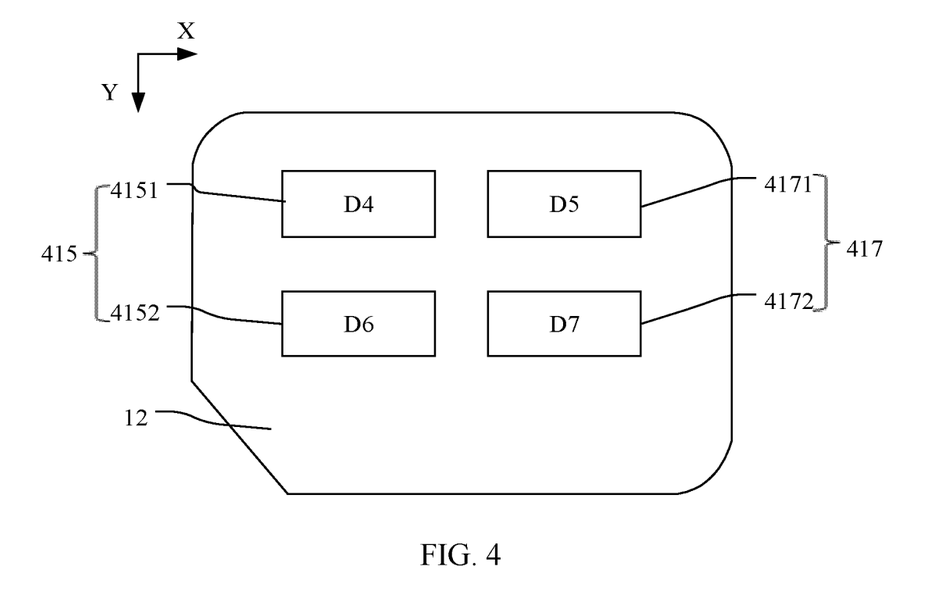
FIG. 4 is a schematic diagram of arrangement of contacts on a second surface of the nano memory card shown in FIG. 1.

FIG. 4 is a schematic diagram of arrangement of contacts on a second surface of the nano memory card shown in FIG. 1. The contacts 41 distributed on the second surface 12 include a third contact group 415 and a fourth contact group 417 that are disposed at intervals along the first direction. The third contact group 415 includes a first contact 4151 and a second contact 4152 that are disposed sequentially along the second direction, and the fourth contact group 417 includes a first contact 4171 and a second contact 4172 that are disposed sequentially along the second direction. The first contact 4151 in the third contact group 415, the second contact 4152 in the third contact group 415, the first contact 4171 in the fourth contact group 417, and the second contact 4172 in the fourth contact group 417 are all used to transmit data. In this implementation, the first contact 4151 is in a same line with the second contact 4152, and the first contact 4171 is in a same line with the second contact 4172. The first contact 4171 is in a same line with the second contact 4172.

In the third contact group 415, the first contact 4151 is marked as a data transmission pin D4, and the second contact 4152 is marked as a data transmission pin D6. In the fourth contact group 417, the first contact 4171 is marked as a data transmission pin D5, and the second contact 4172 is marked as a data transmission pin D7.

Four of the contacts 41 distributed on the first surface 11 (the first contact 4111, the second contact 4112, the first contact 4131, and the fourth contact 4134) and four of the contacts 41 distributed on the second surface 12 (the first contact 4151, the second contact 4152, the first contact 4171, and the second contact 4172) are used to transmit data. In this way, eight contacts 41 of the nano memory card 100 are used to transmit data, which can meet the 8-bit mode in the eMMC protocol 5.0, to achieve a higher transmission speed, for example, a bus speed of 200 MB/s in the HS200 mode and a bus speed of 400 MB/s in the HS400 mode.

In this implementation, a size of the nano memory card 100 is the same as that of an existing nano memory card, and a manner of arranging the contacts 41 on the first surface 11 of the nano memory card 100 is the same as that of the existing nano memory card, so that the nano memory card 100 can be recognized by and compatible with a single-sided card holder in an existing terminal, thereby facilitating use.

Figure 5:
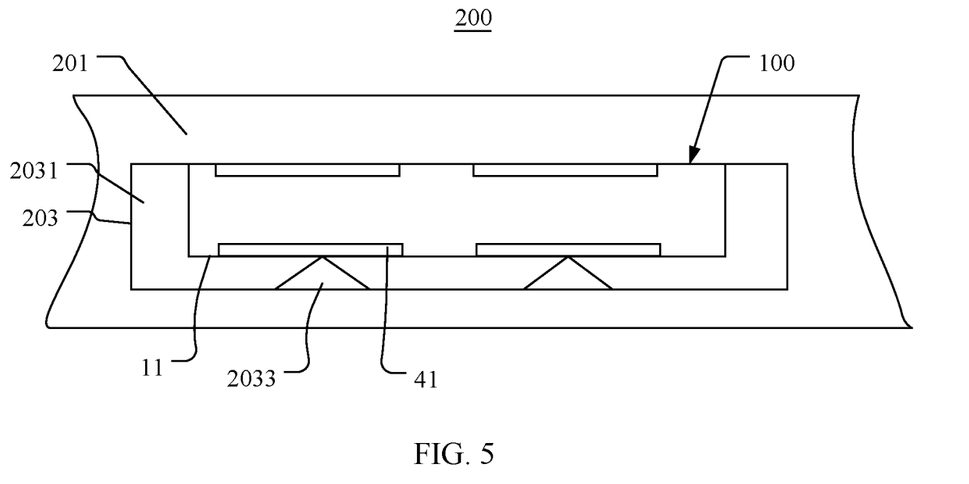
FIG. 5 is a schematic diagram of an application scenario in which a nano memory card is inserted into a terminal having a single-sided contact spring.

FIG. 5 is a schematic diagram of an application scenario of a terminal with a nano memory card according to an implementation of this application. A terminal 200 includes a terminal body 201, a card holder 203 disposed on the terminal body 201, and the foregoing nano memory card 100. The nano memory card 100 is inserted into a cavity 2031 of the card holder 203, and an inner wall of the cavity 2031 facing the first surface 11 is provided with a plurality of first contact springs 2033. Each first contact spring 2033 elastically presses against and is correspondingly in electrical contact with one contact 41 on the first surface 11, to implement signal communication between the contact 41 on the first surface 11 and the card holder 203.

Figure 6:
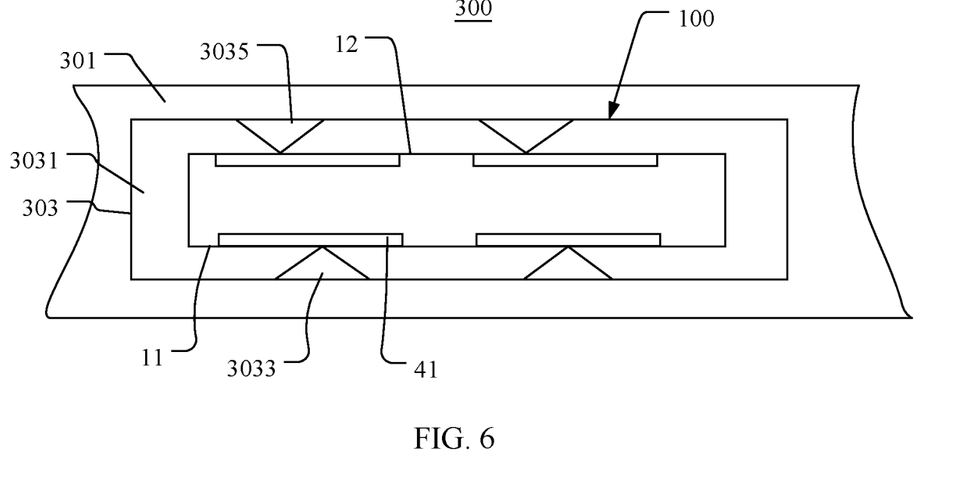
FIG. 6 is a schematic diagram of an application scenario in which a nano memory card is inserted into a terminal having a double-sided contact spring.

FIG. 6 is a schematic diagram of an application scenario of a terminal with a nano memory card according to another implementation of this application. A terminal 300 includes a terminal body 301, a card holder 303 disposed on the terminal body 301, and the foregoing nano memory card 100. The card holder 301 includes a cavity 3031. The nano memory card 100 is inserted into the cavity 3031, and an inner wall of the cavity 3031 facing the first surface 11 is provided with a plurality of first contact springs 3033. Each first contact spring 3033 elastically presses against and is correspondingly in electrical contact with one contact 41 on the first surface 11, to implement signal communication between the contact 41 on the first surface 11 and the card holder 303. An inner wall of the cavity 3031 facing the second surface 12 is provided with a plurality of second contact springs 3035. The second contact spring 3035 elastically presses against and is correspondingly in electrical contact with one contact 41 on the second surface 12, to implement signal communication between the contact 41 on the second surface 12 and the card holder 303. The card holder 303 uses the nano memory card 100 with contacts 41 disposed on both surfaces. In this way, a data transmission speed of the terminal 300 is increased, and user experience is improved.

The terminal 200 or the terminal 300 may include various handheld devices having a communication function, a vehicle-mounted device, a wearable device, a home intelligent device, a computing device, or another processing device connected to a wireless modem, and terminals in various forms, for example, a mobile station (mobile station, MS), a terminal (terminal), a user equipment (user equipment, UE), and a soft terminal such as a water meter, an electricity meter, and a sensor.

In an optional implementation, at least one cable is disposed on a card body of a nano memory card, and the at least one cable is located between pins in an interface. The at least one cable is used to connect a storage unit to a control unit, and the at least one cable is also used to connect the control unit to the interface.

A position of each contact (pin) 41 in the interface on the card body 10 of the memory card 100 is not limited. A length value and a height value of each contact 41 in the interface 40 are not limited. A shape of the contact (or the pin or the connection terminal) 41 mentioned in this embodiment may be a regular rectangle, or may be an irregular shape. The shape of the contact (or the pin or the connection terminal) 41 is not limited in this embodiment. A distance value between an edge of each contact 41 in the interface and each side edge of the nano memory card 100 is not limited. A specific height value and a specific length value of the nano memory card 100 are not limited.

Figure 7:
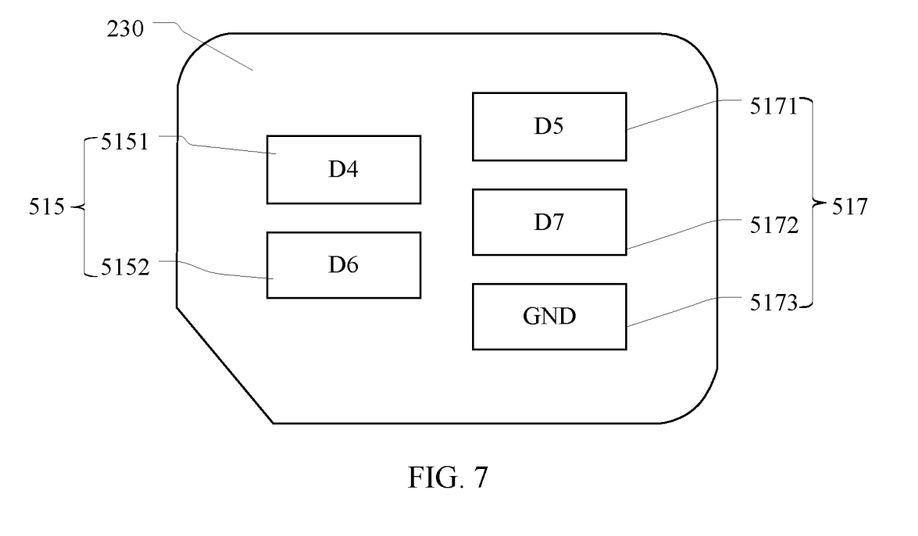
FIG. 7 is a schematic diagram of arrangement of contacts on a second surface of a nano memory card according to a second implementation of this application.

FIG. 7 is a schematic diagram of arrangement of contacts on a second surface of a nano memory card according to a second implementation of this application. The nano memory card provided in the second implementation is substantially the same in structure as the nano memory card provided in the first implementation. Contacts distributed on a second surface 230 include a third contact group 515 and a fourth contact group 517 that are disposed at intervals along a first direction. The third contact group 515 includes a first contact 5151 and a second contact 5152 that are disposed sequentially along a second direction, and the fourth contact group 517 includes a first contact 5171 and a second contact 5172 that are disposed sequentially along the second direction. The first contact 5151 and the second contact 5152 in the third contact group 515 and the first contact 5171 and the second contact 5172 in the fourth contact group 517 are all used to transmit data. A difference lies in that the fourth contact group 517 further includes a third contact 5173 used to transmit a power supply ground signal.

In the third contact group 515, the first contact 5151 is marked as a data transmission pin D4, and the second contact 5152 is marked as a data transmission pin D6. In the fourth contact group 517, the first contact 5171 is marked as a data transmission pin D5, the second contact 5172 is marked as a data transmission pin D7, and the third contact 5173 is marked as a power supply ground signal pin GND.

Figure 8:
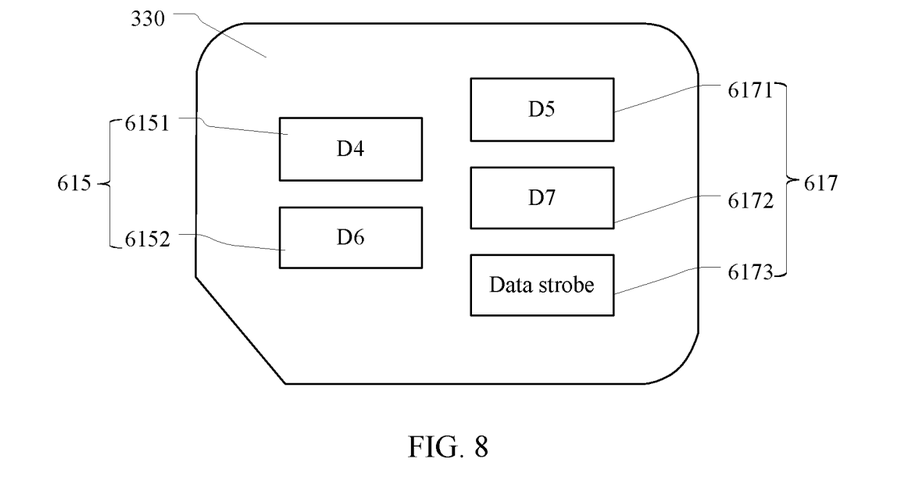
FIG. 8 is a schematic diagram of arrangement of contacts distributed on a second surface of a nano memory card according to a third implementation of this application.

FIG. 8 is a schematic diagram of arrangement of contacts on a second surface of a nano memory card according to a third implementation of this application. The nano memory card provided in the second implementation is substantially the same in structure as the nano memory card provided in the first implementation. Contacts distributed on a second surface 330 include a third contact group 615 and a fourth contact group 617 that are disposed at intervals along a first direction. The third contact group 615 includes a first contact 6151 and a second contact 6152 that are disposed sequentially along a second direction, and the fourth contact group 617 includes a first contact 6171 and a second contact 6172 that are disposed sequentially along the second direction. The first contact 6151 and the second contact 6152 in the third contact group 615 and the first contact 6171 and the second contact 6172 in the fourth contact group 617 are all used to transmit data. A difference lies in that the fourth contact group 617 further includes a third contact 6173 used to transmit a data strobe signal.

In the third contact group 615, the first contact 6151 is marked as a data transmission pin D4, and the second contact 6152 is marked as a data transmission pin D6. In the fourth contact group 617, the first contact 6171 is marked as a data transmission pin D5, the second contact 6172 is marked as a data transmission pin D7, and the third contact 6173 is marked as a data strobe (data strobe) signal pin.

Figure 9:
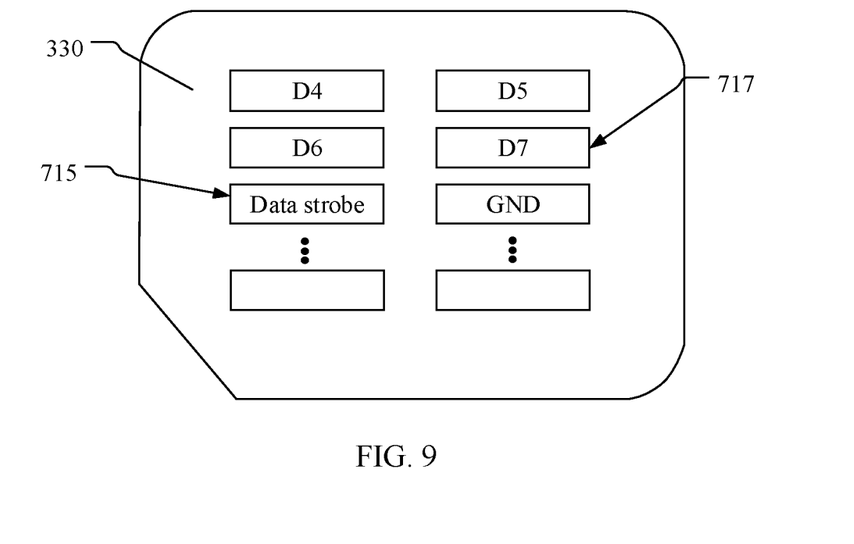
FIG. 9 is a schematic diagram of arrangement of contacts distributed on a second surface of a nano memory card according to a fourth implementation of this application.

FIG. 9 is a schematic diagram of arrangement of contacts on a second surface of a nano memory card according to a fourth implementation of this application. The nano memory card provided in the fourth implementation is substantially the same in structure as the nano memory card provided in the first implementation. Contacts distributed on a second surface 430 include a third contact group 715 and a fourth contact group 717 that are disposed at intervals along a first direction. A difference lies in that the third contact group 715 includes a first contact, a second contact, a third contact, . . . , and an $N^{th}$ contact that are disposed sequentially along a second direction, and the fourth contact group 717 includes a first contact, a second contact, a third contact, . . . , and an $M^{th}$ contact that are disposed sequentially along the second direction. Both the first contact and the second contact in each of the third contact group 715 and the fourth contact group 717 are used to transmit data. N and M may be the same or different. In this implementation, the first contact in the third contact group 715, the second contact in the third contact group 715, the first contact in the fourth contact group 717, and the second contact in the fourth contact group 717 are used to transmit data.

It may be understood that the contacts distributed on the first surface and the contacts distributed on the second surface may be arranged irregularly. To be specific, the contacts distributed on the first surface are not limited to be arranged along the first direction and the second direction, and the contacts distributed on the second surface are not limited to be arranged along the first direction and the second direction. Four of the contacts distributed on the first surface and at least four contacts distributed on the second surface are used to transmit data.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A nano memory card comprising:
    a card body comprising:
        a first surface; and
        a second surface opposite from the first surface;
    a chip disposed inside the card body; and
    an interface disposed on the first surface and electrically coupled to the chip, wherein the interface comprises:
        first surface contacts distributed on the first surface and configured to transmit data, wherein the first surface contacts comprise a first contact group and a second contact group that are disposed at intervals along a first direction, wherein the first contact group comprises a first contact, a second contact, a third contact, and a fourth contact that are disposed in sequence along a second direction, wherein the second contact group comprises a fifth contact, a sixth contact, a seventh contact, and an eighth contact that are disposed in sequence along the second direction, wherein the first direction is different from the second direction, wherein the first contact, the third contact, the fifth contact, and the eighth contact are configured to transmit the data, wherein the second contact is configured to transmit a power supply signal, wherein the fourth contact is configured to transmit a clock signal, wherein the sixth contact is configured to transmit a first power supply ground signal, and wherein the seventh contact is configured to transmit a command signal; and
        second surface contacts distributed on the second surface and configured to transmit the data, wherein the second surface contacts comprise a third contact group and a fourth contact group that are disposed at intervals along the first direction,
        wherein the third contact group comprises a ninth contact and a tenth contact that are disposed in sequence along the second direction,
        wherein the fourth contact group comprises an eleventh contact and a twelfth contact that are disposed in sequence along the second direction, and
        wherein the ninth contact, the tenth contact, the eleventh contact, and the twelfth contact are configured to transmit the data.

2. The nano memory card of claim 1, wherein the fourth contact group further comprises a thirteenth contact configured to transmit a second power supply ground signal, and wherein the twelfth contact is located between the eleventh contact and the thirteenth contact.

3. The nano memory card of claim 1, wherein the third contact group further comprises a thirteenth contact configured to transmit a second power supply ground signal, and wherein the tenth contact is located between the ninth contact and the thirteenth contact.

4. The nano memory card of claim 1, wherein the third contact group further comprises a thirteenth contact configured to transmit a data strobe signal, and wherein the tenth contact is located between the ninth contact and the thirteenth contact.

5. The nano memory card of claim 1, wherein the card body further comprises:
    a first substrate; and
    a second substrate fastened to the first substrate and comprising a third surface facing the first substrate, wherein the third surface is configured for a storage component and a control component to be fastened on the third surface,
    wherein the first substrate and the second substrate enclose an accommodation space,
    wherein the first surface is of the first substrate and faces away from the second substrate, and
    wherein the second surface is of the second substrate and faces away from the first substrate.

6. The nano memory card of claim 1, wherein the card body further comprises:
    a first substrate comprising:
        a first plate body, wherein the first surface is of the first plate body; and
        a first electrical-connection part convexly disposed on the first surface; and
    a second substrate comprising:
        a second plate body, wherein the second surface is of the second plate body and faces the first substrate; and
        a second electrical-connection part convexly disposed on the second surface and interconnected to the first electrical-connection part using a solder ball, wherein the first surface faces the second substrate.

7. The nano memory card of claim 6, wherein the first electrical-connection part comprises:
    a first electrical-connection boss convexly disposed on a third surface of the first plate body facing the second plate body and comprising a first end that faces away from the first plate body; and
    a first electrical-connection column fastened to the first end,
    wherein the second electrical-connection part comprises:
        a second electrical-connection boss convexly disposed on a fourth surface of the second plate body facing the first plate body and comprising a second end that faces away from the second plate body; and a second electrical-connection column fastened to the second end, and wherein the solder ball is coupled between the first electrical-connection column and the second electrical-connection column.

8. The nano memory card of claim 1, wherein the chip comprises:
a first chip comprising a control component; and
a second chip coupled to the first chip and comprising a storage component.

9. The nano memory card of claim 8, further comprising an interface drive circuit coupled to the control component and the interface and configured to drive the interface.

10. A terminal comprising:
a terminal body;
a nano memory card;
a card body comprising:
a first surface;
a second surface opposite from the first surface;
a first substrate; and
a second substrate fastened to the first substrate and comprising a third surface facing the first substrate, wherein the third surface is configured for a storage component and a control component to be fastened on the third surface, wherein the first substrate and the second substrate enclose an accommodation space, wherein the first surface is of the first substrate and faces away from the second substrate, and wherein the second surface is of the second substrate and faces away from the first substrate;
a chip disposed inside the card body; and
an interface disposed on the first surface and electrically coupled to the chip, wherein the interface comprises:
first surface contacts distributed on the first surface and configured to transmit data, wherein the first surface contacts comprise a first contact group and a second contact group that are disposed at intervals along a first direction, wherein the first contact group comprises a first contact, a second contact, a third contact, and a fourth contact that are disposed in sequence along a second direction, wherein the second contact group comprises a fifth contact, a sixth contact, a seventh contact, and an eighth contact that are disposed in sequence along the second direction, wherein the first direction is different from the second direction, wherein the first contact, the third contact, the fifth contact, and the eighth contact are configured to transmit the data, wherein the second contact is configured to transmit a power supply signal, wherein the fourth contact is configured to transmit a clock signal, wherein the sixth contact is configured to transmit a first power supply ground signal, and wherein the seventh contact is configured to transmit a command signal; and
second surface contacts distributed on the second surface and configured to transmit the data; and
a card holder disposed on the terminal body comprising a cavity accommodating the nano memory card, and comprising:
a first inner wall facing the first surface and comprising a plurality of first contact springs, wherein each of the first contact springs is respectively in electrical contact with one of the first surface contacts; and
a second inner wall facing the second surface and comprising a plurality of second contact springs,
wherein each of the second contact springs is respectively in electrical contact with one of the second surface contacts.

11. The terminal of claim 10, wherein the second surface contacts comprise a third contact group and a fourth contact group that are disposed at intervals along the first direction, wherein the third contact group comprises a ninth contact and a tenth contact that are disposed in sequence along the second direction, wherein the fourth contact group comprises an eleventh contact and a twelfth contact that are disposed in sequence along the second direction, and wherein the ninth contact, the tenth contact, the eleventh contact, and the twelfth contact are configured to transmit the data.

12. The terminal of claim 11, wherein the fourth contact group further comprises a thirteenth contact configured to transmit a second power supply ground signal, and wherein the twelfth contact is located between the eleventh contact and the thirteenth contact.

13. The terminal of claim 11, wherein the third contact group further comprises a thirteenth contact configured to transmit a second power supply ground signal, and wherein the tenth contact is located between the ninth contact and the thirteenth contact.

14. The terminal of claim 11, wherein the third contact group further comprises a thirteenth contact configured to transmit a data strobe signal, and wherein the tenth contact is located between the ninth contact and the thirteenth contact.

15. The terminal of claim 10, wherein the card body further comprises:
the first substrate comprising:
a first plate body, wherein the first surface is of the first plate body; and
a first electrical-connection part convexly disposed on the first surface; and
the second substrate comprising:
a second plate body, wherein the second surface is of the second plate body and faces the first substrate; and
a second electrical-connection part convexly disposed on the second surface and interconnected to the first electrical-connection part using a solder ball, wherein the first surface faces the second substrate.

16. The terminal of claim 15, wherein the first electrical-connection part comprises:
a first electrical-connection boss convexly disposed on a fourth surface of the first plate body facing the second plate body and comprising a first end that faces away from the first plate body; and
a first electrical-connection column fastened to the first end,
wherein the second electrical-connection part comprises:
a second electrical-connection boss convexly disposed on a fifth surface of the second plate body facing the first plate body and comprising a second end that faces away from the second plate body; and
a second electrical-connection column fastened to the second end, and
wherein the solder ball is coupled between the first electrical-connection column and the second electrical-connection column.

17. The terminal of claim 10, wherein the chip comprises:
a first chip comprising the control component; and
a second chip coupled to the first chip and comprising the storage component.

18. The terminal of claim 10, wherein the nano memory card further comprises an interface drive circuit coupled to the control component and the interface and configured to drive the interface.

19. A nano memory card comprising:
    a card body comprising:
        a first surface;
        a second surface opposite from the first surface;
        a first substrate comprising:
            a first plate body, wherein the first surface is of the first plate body; and
            a first electrical-connection part convexly disposed on the first surface; and
        a second substrate comprising:
            a second plate body, wherein the second surface is of the second plate body and faces the first substrate; and
            a second electrical-connection part convexly disposed on the second surface and interconnected to the first electrical-connection part using a solder ball, wherein
        the first surface faces the second substrate;
    a chip disposed inside the card body; and
    an interface disposed on the first surface and electrically coupled to the chip, wherein the interface comprises:
        first surface contacts distributed on the first surface and configured to transmit data, wherein the first surface contacts comprise a first contact group and a second contact group that are disposed at intervals along a first direction, wherein the first contact group comprises a first contact, a second contact, a third contact, and a fourth contact that are disposed in sequence along a second direction, wherein the second contact group comprises a fifth contact, a sixth contact, a seventh contact, and an eighth contact that are disposed in sequence along the second direction, wherein the first direction is different from the second direction, wherein the first contact, the third contact, the fifth contact, and the eighth contact are configured to transmit the data, wherein the second contact is configured to transmit a power supply signal, wherein the fourth contact is configured to transmit a clock signal, wherein the sixth contact is configured to transmit a first power supply ground signal, and wherein the seventh contact is configured to transmit a command signal; and
        second surface contacts distributed on the second surface and configured to transmit the data.

20. The nano memory card of claim 19, wherein the second surface contacts comprise a third contact group and a fourth contact group that are disposed at intervals along the first direction,
    wherein the third contact group comprises a ninth contact and a tenth contact that are disposed in sequence along the second direction,
    wherein the fourth contact group comprises an eleventh contact and a twelfth contact that are disposed in sequence along the second direction, and
    wherein the ninth contact, the tenth contact, the eleventh contact, and the twelfth contact are configured to transmit the data.

* * * * *